United States Patent [19]

Akeel

[11] Patent Number: 5,313,854

[45] Date of Patent: May 24, 1994

[54] LIGHT WEIGHT ROBOT MECHANISM

[75] Inventor: Hadi A. Akeel, Rochester Hills, Mich.

[73] Assignee: Fanuc Robotics North America, Inc., Auburn Hills, Mich.

[21] Appl. No.: 59,176

[22] Filed: May 7, 1993

Related U.S. Application Data

[63] Continuation of Ser. No. 830,888, Feb. 4, 1992, abandoned.

[51] Int. Cl.⁵ .................... G05G 11/00; B25J 11/00
[52] U.S. Cl. ................... 74/479 BF; 212/239; 901/21; 901/43
[58] Field of Search ............... 74/479 R, 479 BF; 212/239, 266; 901/8, 14, 21, 23, 43

[56] References Cited

U.S. PATENT DOCUMENTS

| 4,273,482 | 6/1981 | Lloyd et al. ............ 901/9 X |
| 4,417,845 | 11/1983 | Burton ................... 901/14 X |
| 4,489,838 | 12/1984 | Cozad ................... 212/239 X |
| 4,639,878 | 1/1987 | Day et al. ............ 364/474.35 X |
| 4,666,362 | 5/1987 | Landsberger et al. ...... 901/21 X |
| 4,683,773 | 8/1987 | Diamond ................ 74/479 |
| 4,812,104 | 3/1989 | Suzuki ................. 901/21 X |

FOREIGN PATENT DOCUMENTS

| 97562 | 1/1984 | European Pat. Off. ........ 901/14 |
| 2592828 | 7/1987 | France ...................... 901/21 |
| 21690 | 8/1961 | German Democratic Rep. .................. 212/266 |
| 2-218583 | 8/1990 | Japan ...................... 901/23 |
| 1303398 | 4/1987 | U.S.S.R. .................. 901/23 |
| 1440859 | 11/1988 | U.S.S.R. .................. 212/239 |

Primary Examiner—Allan D. Herrmann
Attorney, Agent, or Firm—Brooks & Kushman

[57] ABSTRACT

A light weight conventional robot and method for use in connection with the surface preparation of large objects. The robot has a tool attached to an object flange which is supported by a collapsible member, allowing the tool to move to and fro. The member is pivotally mounted to a base so that the tool may be manipulated in all directions. There are at least three independently mountable blocks which allow the robot to be easily adapted to the work envelope without any change to the envelope itself. Tensile members connect the mounting blocks to the object flange to control the movement of the tool. The tensile members may be one continuous non-accumulating member or separate members which respectively allow the robot to move in two or three degrees of freedom, by varying the length of each member.

13 Claims, 5 Drawing Sheets

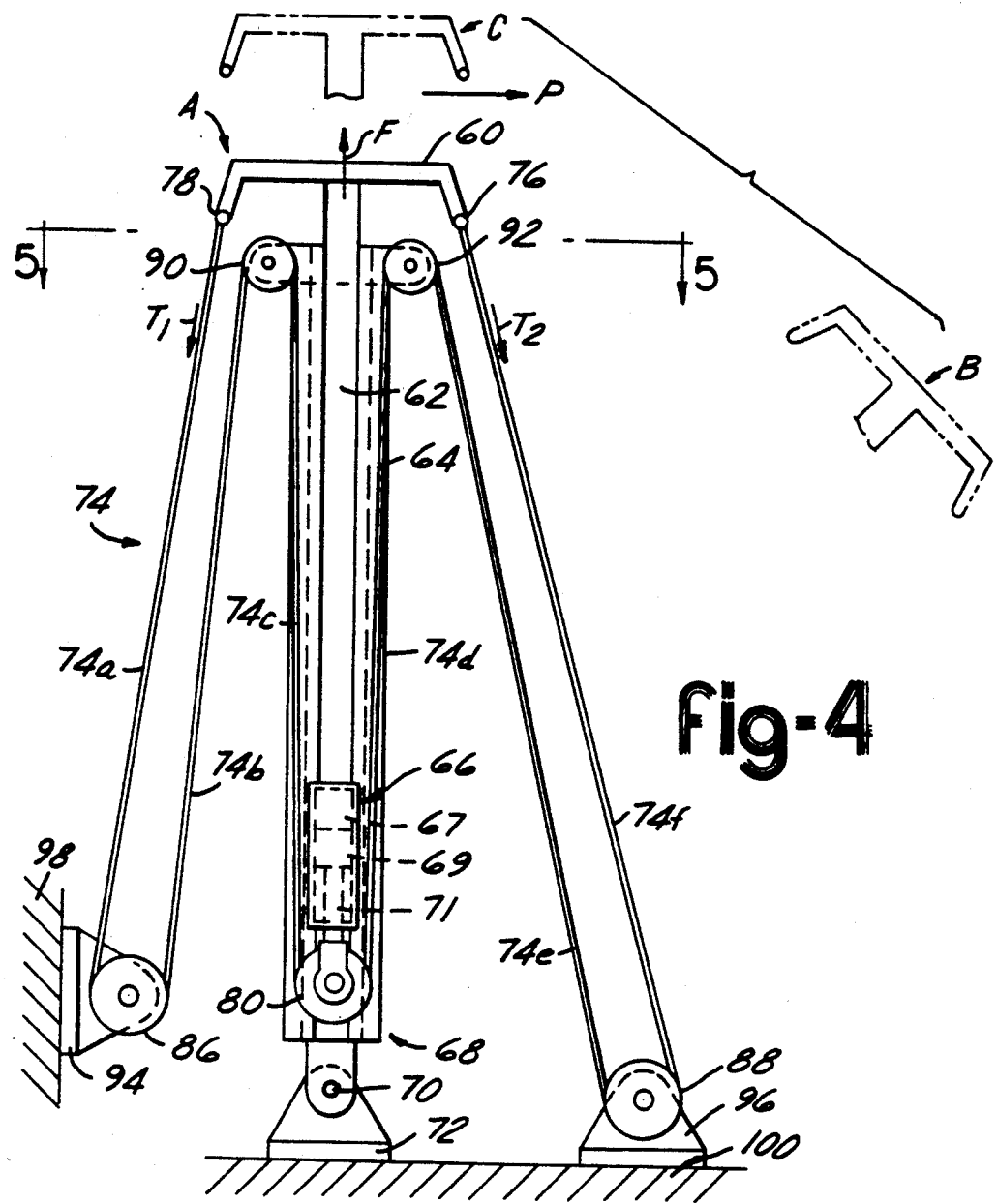
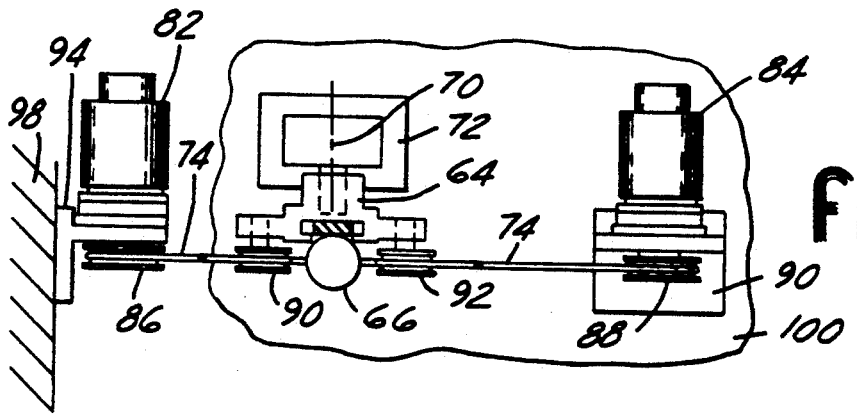

LIGHT WEIGHT ROBOT MECHANISM

This is a continuation of copending application Ser. No. 07/830,888 filed on Feb. 4, 1992, now abandoned.

TECHNICAL FIELD

This invention relates to light weight robot mechanisms and, in particular, to light weight robot mechanisms adaptable for large working envelopes to manipulate a tool around a large fixed workpiece.

BACKGROUND ART

Conventional robot mechanisms use rigid links articulated at a plurality of joints or sliding within guiding bearings relative to each other. Such mechanisms, because their links are usually loaded in a bending mode, always yield heavy robots in relation to their load carrying capability. The ratio of robot weight to its payload may range between 100 to over 1000, with the ratio increasing for robots having larger working envelopes. For example, an automotive painting robot that carries 5 kgs of payload may weigh as much as 1000 Kgs with a ratio of 200. Using the same robot for painting aircraft, for which the working envelope is particularly large, additional positioning structures and mechanisms weighing several tons must be added. Such structures are complex, heavy and costly to install, align, and maintain. Their drives consume considerable energy, they use valuable space, require special costly considerations to avoid damaging collisions with the work objects of the robots.

Some prior art has adopted tensile members such as is disclosed in U.S. Pat. No. 4,666,362, Landsberger, et al, issued May 19, 1987, wherein a passive compressive central spine is compressed against the pull forces of tensile cables. Such mechanisms are known as parallel link mechanisms, wherein motion is actuated by links that are all anchored to one common base. This is in contrast with serial type robot mechanisms wherein several links may be stacked in series with each other with one or more links anchored to a base.

Parallel link mechanisms having relatively long links offer advantages over serial link mechanisms for constructing robots with large work envelopes. Their relative component simplicity, low weight, and the application of driving forces directly to the payload, hence requiring minimum driving power, are attractive features. However, such advantages are less relevant for mechanisms providing a small working or motion envelope or are limited to orientation control such as robotic wrist actuation. It is even disadvantageous to have long links anchored to a robot base and remotely actuating the orientation function of a robot wrist, since such links would have excessive compliance and are difficult to construct with necessary accuracy by virtue of their length.

It is therefore preferable for robot construction to use a parallel link type mechanism where it has the advantage, of positioning when the work envelope is large. It may then be complemented with a simpler serial linkage for orientational adjustments, or additional short positional moves whenever additional degrees of freedom are required. Some prior art, such as that disclosed in U.S. Pat. No. 4,666,362 employs driving methods which cause the actuators to be loaded continuously against a passive central repulsive force, regardless of the motion or load of the mechanism thus consuming energy unnecessarily. It is preferable, of course, that the loading of actuators be devoted to the productive function of the mechanism and be relieved of internal loads.

Furthermore, all conventional robots, including prior art robots of the parallel link type, are built with a common base supporting the structure of the robot. Such a common base is inflexible and allows limited installation possibilities. Therefore, it is desirable to have a robot that can be mounted to fit the environment of its application such as by attaching it selectively to existing building structures by locating the supporting points favorably to minimize the loading on the robot components, increase the work envelope, and avoid interferences with surrounding equipment and structures.

SUMMARY OF THE INVENTION

The invention uses slender, axial links that are pivoted at their ends and loaded primarily in tension or compression rather than in a bending or torsional mode. Tension elements such as slender bars, strings, ribbons and cables or the like can be made to carry very high loads in relation to their mass, and can be increased in length without adding appreciable mass. The use of tensile elements reduces weight and cost and makes the robot easy to install and reconfigure. Each of the invention's tensile elements is anchored to independently mountable mounting blocks which can be positioned to fit the available mounting structures, thus allowing reconfiguration capability to fit the working environment of the robot. This includes mounting on floors, ceilings, walls, and even associated machinery structures. Combination of such mounting provisions is equally possible.

With this invention, a load may be moved by means of a set of links anchored to a fixed structure to provide controlled positioning, while another set of linkage is serially coupled to the first set to orientate the load. Hence, the invention permits the dedication of different mechanism types to the motions where they are best suited, and optimizes the use of a parallel and serial linkage combination.

In one embodiment, the invention uses the retraction of one element to compensate for the expansion of another, thus allowing tension elements of constant length to be used and avoiding the need to accumulate such elements at a base.

In another embodiment, the invention uses one continuous tensile element to couple two motion actuators and effect a two degree of freedom motion, wherein the two motions are complementary, hence avoiding the need to accumulate the tensile element at any of the two actuators. In this embodiment, the invention provides self balancing means for its internal forces that, on the average, require no external energy input to maintain their balance. Independently mounted actuators are utilized to change the state of balance and cause the mechanism to move. Thus, the mechanism of this invention allows the primary, and heavy, positioning actuators to remain stationary, hence energy can be utilized in moving only light masses, thus minimizing energy consumption.

In both of these embodiments, the invention uses identical actuating modules for positioning respectively in either two or three dimensional space, hence reducing the cost by allowing the manufacturing of the modules in larger quantities, simplifying maintenance, training, and installation; and reducing inventory requirements.

In the preferred embodiments, the invention comprises either an active or passive collapsible element acting against two or more actively controlled tensile members. The collapsible element acts like a compression spring, pivoted at one end to a fixed pivotal block, and repulsing an object flange away from the pivot. At least two tensile members pull the object flange with two force vectors having components directed towards the pivot. At any position, the forces of tension are in balance with the forces of compression. In the three dimensional embodiments, the collective elongation of the tension members causes the object flange to be displaced outwardly from the pivot by the repulsive compression force, while the difference in their elongation causes the object flange to move angularly. The collapsible element is compliant axially and, preferably, rigid in torsion and bending. It may be constructed as a guided compression spring, a pressurized cylinder with torsionally constrained elements, or, preferably a pair of links constrained to slide telescopically and/or relative to each other and forced axially apart by the action of a pulley and a pre-tensioned belt system.

In all embodiments, the collapsible element is fixed at one end to the object flange and pivoted at the other end to rotate about one axis for two dimensional motion, or two preferably orthogonal axes for three dimensional motion. Either the pivoting block or the object flange may further be rotated for additional positioning flexibility.

The tensile members may be actuated by means of pulleys, cylinders, drums, spools, or the like to impart a force along the tensile members as well as to change its length between the object flange and the pivot. Non-accumulating tensile members require pulleys to actuate, while accumulating elements require devices such as spools or drums. The actuators of the tension elements are pivoted to relieve the tensile members from non-axial loading during the operation of the mechanism. Accordingly, for rotary actuation, such as by use of a spool, the axis of the spool allows bending about the axis parallel to the axis of rotation of the spool, and the spool may be mounted to rotate about another orthogonal axis if the mechanism has two axes for angular movement.

When the object flange in this invention supports a three-axis robotic wrist, the combination of the mechanism of this invention and the wrist comprises a robotic manipulator capable of performing in multi-dimensional space. The addition of a programmable controller forms a system that can perform programmable robotic tasks.

When provided with a programmable controller, the mechanism constitutes a multi-degree of freedom robot capable of manipulating a payload with a minimum of drive power or energy. The mass of the resultant robot is primarily comprised of its collapsible member and the wrist mechanism. In general, the mass of the resultant robot becomes a small fraction of that of a conventional robot of comparable performance. An increase in the work envelope only increases the mass of the resultant robot by what is necessary to make the collapsible element longer, a linear proportionality. This contrasts with a conventional robot, having elements loaded in bending or torsion, wherein such weight increase may approximate a cubic function of the increase in the linear dimensions of the work envelope.

In the preferred embodiments, the invention is configurable to mount in any orientation on the work envelope relative to the gravity vector such that gravity can be effectively compensated for, or utilized to complement the repulsive force of the collapsible member (such as for mounting from a ceiling).

Accordingly, it is an object of this invention to provide a robot mechanism that is easily configured to a variety of mounting preferences.

Another object of this invention is to provide a robot mechanism that uses the structure of its environment as a reconfigurable base, thus allowing flexibility and ease of installation, including having several robots sharing the same common mounting structure.

It is another object of the invention to provide a low mass, modularly simple, mechanism that can be built and used effectively for multiple degrees of freedom robots having large work envelopes.

Yet another object of the invention is to provide a manipulator mechanism that utilizes parallel linkage and can be combined with a robot mechanism utilizing serial type linkage.

Still another object of this invention is to provide an improved robot that is of low cost and is easily manufactured.

Yet still another object of the present invention is to provide an improved manipulator and method that is efficient in the use of energy by virtue of equilibrating forces.

Another object of the invention is to provide a parallel link type mechanism that allows the use of both accumulating and non-accumulating tensile members.

A more specific object of this invention is to provide an improved robot adjustable with respect to a work space for working on a large workpiece such as a commercial aircraft, a naval ship, or the like.

Another more specific object of this invention is to provide an improved manipulator with a base adapted to be fixed with respect to said work space, an object flange which is spaced from the base and supports a wrist mechanism adapted to hold a tool for working on the workpiece and a collapsible member having first and second members telescopically movable with respect to each other with the first member being pivotally connected to the base and the second member being affixed to the object flange.

Another more specific object is to provide an improved manipulator with a plurality of anchor blocks independently mounted with respect to the base and the work space and a plurality of actuators, each connected to a respective one of the anchor blocks.

Another more specific object of this invention is to provide an improved robot mechanism having a tensile means including a plurality of tensile portions connected at one end thereof to the object flange and at the other end to one of the actuators, with each of the actuators being operable to change the length of its respective tensile portion by selectively pulling on its respective portion and with each being independently mountable.

It is another more specific object of the invention to provide an energizing means operable through the first and second members of the collapsible member to push the object flange away from the base whereby the object flange is always pulled by the tensile means toward the bases while the object flange is simultaneously being pushed away from the base by the collapsible member such that the object flange attains a state of force equilibrium while the anchor blocks can be independently mounted with respect to the work space to minimize the loading on the actuators in relation to the forces acting on the mechanism.

These and other objects, features and advantages of the present invention will be more apparent from the following description and drawings.

BRIEF DESCRIPTION OF THE DRAWINGS

FIG. 4 is a side elevational view, somewhat schematic, partly in elevation showing a second embodiment incorporating the principles of the invention and having two degrees of freedom;

FIG. 5 is a sectional view of the invention partly in elevation and with parts broken away taken on line 5—5 in FIG. 4;

DETAILED DESCRIPTION OF THE PREFERRED EMBODIMENTS

Figure 1:
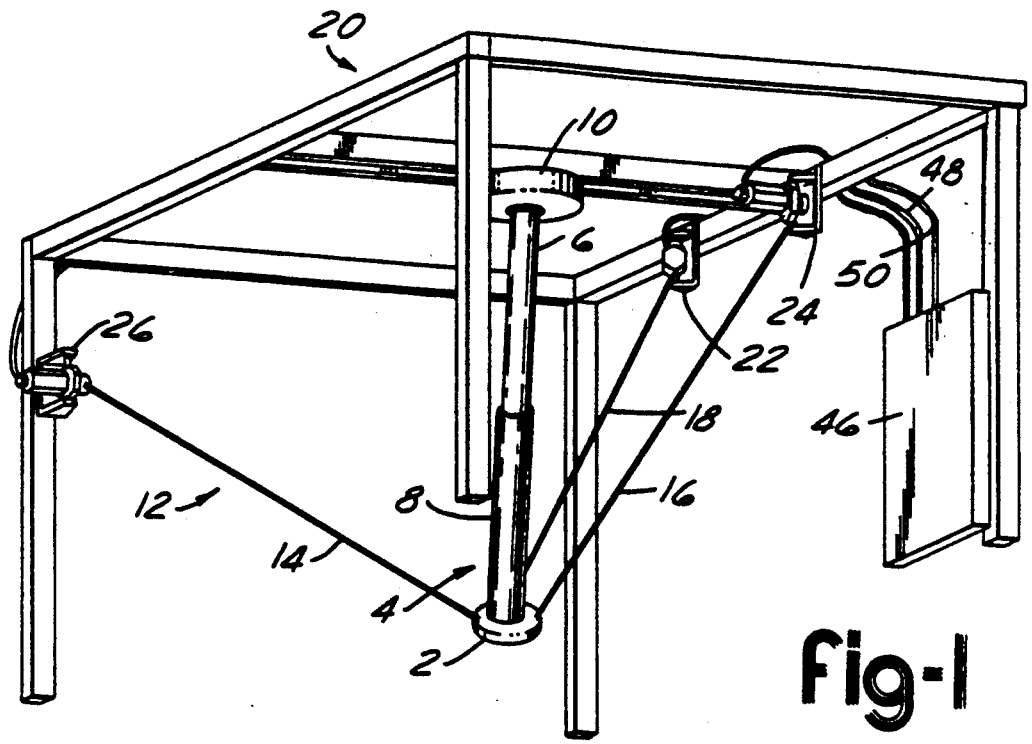
FIG. 1 is a perspective view, somewhat schematic, showing one embodiment of a ceiling mounted robot with one collapsible member and including the independently mounted anchor block principles of the invention.
Figure 9:
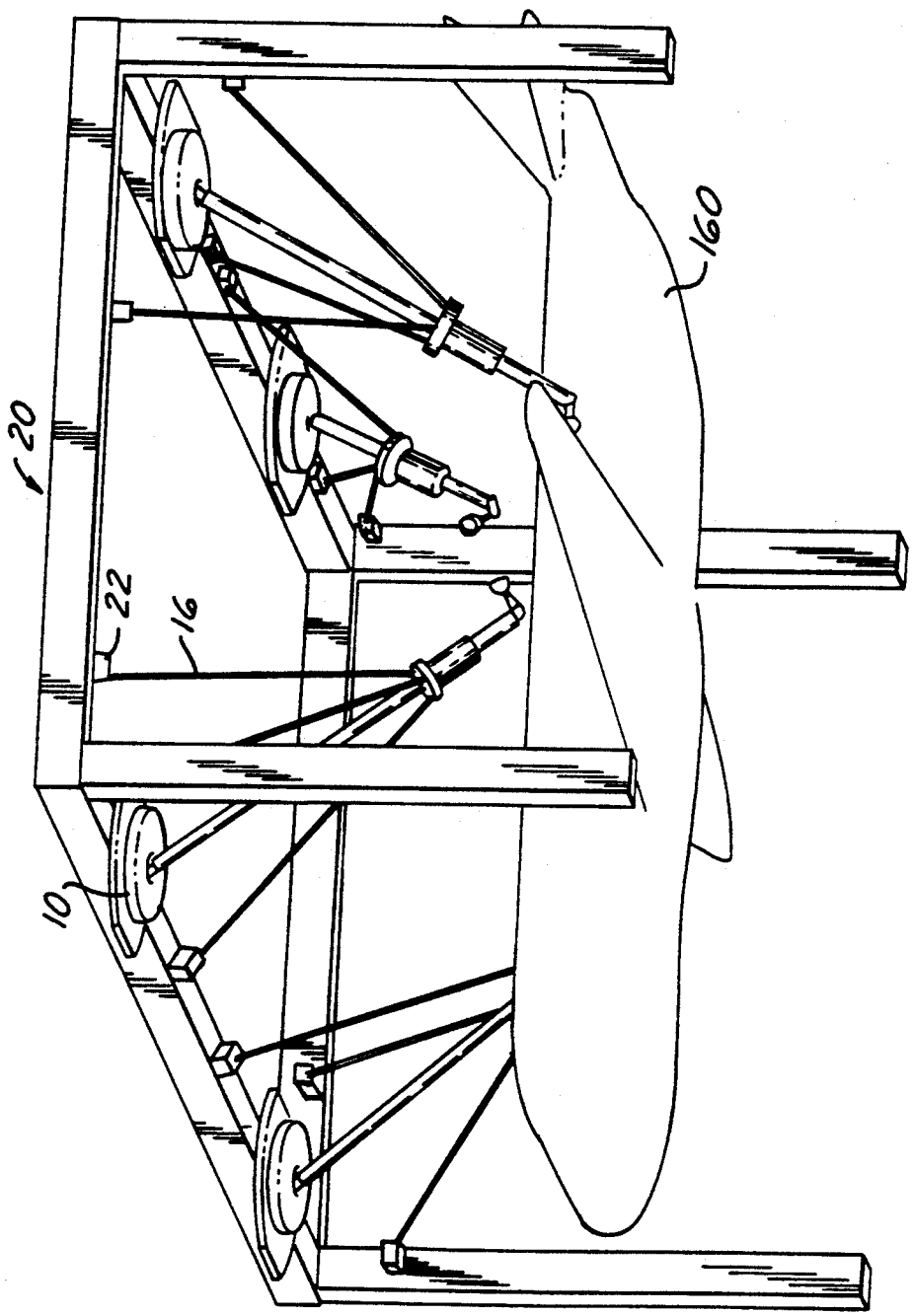
FIG. 9 is a perspective view, somewhat schematic, showing the invention applied in a large envelope as a manipulator for painting or preparing aircraft surfaces.

With reference to FIG. 1, the invention is shown as a robot or object positioning mechanism adjustable with respect to a work space adaptable for working on a large workpiece such as a commercial aircraft or the like, see for instance, FIG. 9. The robot is configured from modular elements to mount on a ceiling. An object flange 2 is attached to a collapsible element 4. The collapsible element is made up of a first member 6 and a second member 8 which slide telescopically or linearly in relation to each other. The first member 6 is pivotally mounted to, a pivot block 10. The second member 8 relatively linearly slidably relates to the first member 6 at one end and the object flange 2 at the other end. The collapsible element 4 has energizing means generating a continuous outwardly biased or repulsive force, and is kept in equilibrium by virtue of the pull forces of tensile means 12. In the embodiment shown in FIG. 1, the tensile means 12 is composed of three independent tensile members or portions 14, 16 and 18 acting against the repulsive force of collapsible element 4.

The collapsible element 4 is pivotally mounted at pivot block 10 to a mounting structure 20 to pivot universally on the pivot block. The mounting structure 20 is the working envelope, such as a paint booth or manufacturing building for any large, irregularly shaped work space. Actuators 22, 24 and 26 apply a force to respective tensile members 14, 16 and 18 to keep the tensile members 14, 16 and 18 in equilibrium with the continuous outwardly biased force of the collapsible element 4. Actuators 22, 24 and 26 are attached to the mounting structure at locations selected to suit the operating and loading conditions of the robot.

Figure 2:
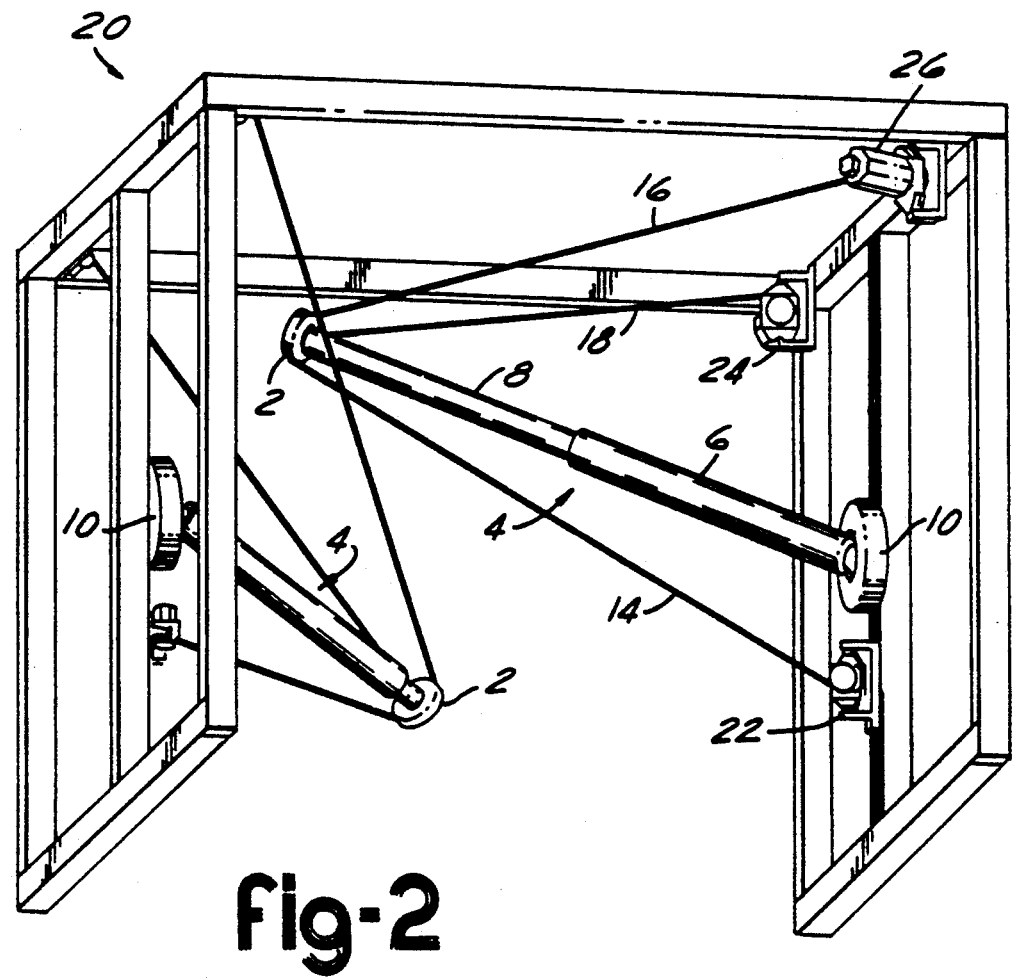
FIG. 2 is a perspective view of the invention showing two of the embodiments in FIG. 1 with two collapsible members.

With reference to FIG. 2, the embodiment shown in FIG. 1 is shown as adapted for mounting on a wall. The pivot block 10 is mounted on mounting structure 20, which is on the wall to pivot universally on its respective pivot block. The collapsible element 4 has a continuous outwardly repulsive force F, and is kept in equilibrium by virtue of the selective pull forces of individual tensile members 14, 16 and 18, acting against the repulsive force of collapsible element 4. Actuators 22, 24 and 26 are attached to the mounting structure at locations selected to minimize the loading and operating stresses on the robot. Actuators 22, 24 and 26 apply tensile forces to tensile members 14, 16 and 18, respectively, which pull on the object flange 2 to operate against the repulsive forces of the collapsible member 4 to control the pivoting of the collapsible member.

Figure 3:
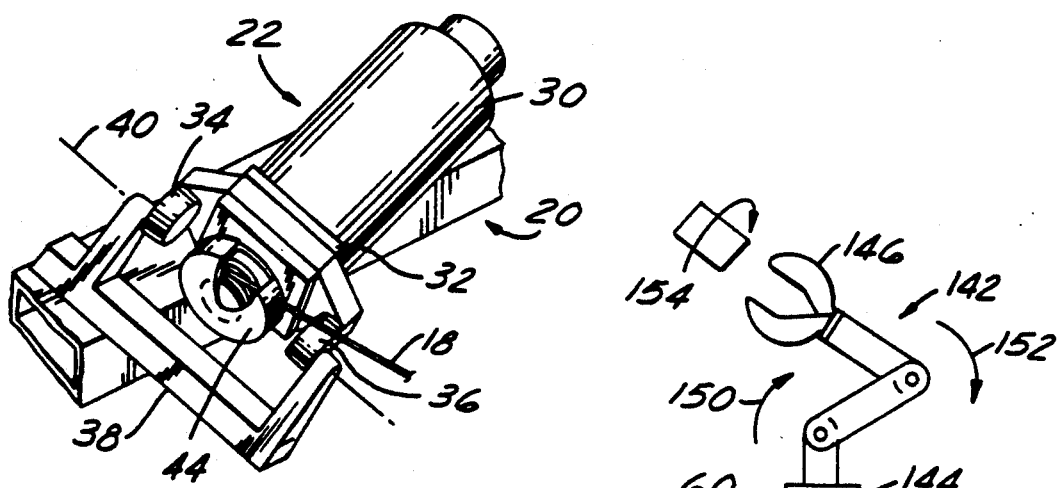
FIG. 3 is a perspective view of a typical actuator connected to an anchor or mounting block as used in the invention.

Actuator 22, typical of actuators 24 and 26, is shown in FIG. 3. A motor 30 is coupled to a speed reducer 32 and pivotally mounted by brackets 34 and 36 to a mounting block 38 allowing the actuator to pivot about pivotal axis 40. Mounting block 38 is mounted or attached to the desired support surface of the mounting structure 20 as the robot is being installed. Tensile element 18, which is typical of tensile elements 14 and 16 is shown spooling on spool 44 which is rotated by actuator motor 30 to wind or unwind the tensile element to move the object flange 2 in the desired pivotal pattern. An alternate approach is to use a linear actuator such as a hydraulic cylinder or a screw and nut arrangement (not illustrated).

The mechanism is coupled to a programmable controller 46 shown in FIG. 1 which programmably controls actuators 22, 24 and 26, as well as other robot auxiliaries, such as wrist actuators and end effectors, by means of control cables such as 48 and 50 shown only for actuators 22 and 24, respectively.

Another embodiment of the invention is shown in FIGS. 4 and 5. Again, an object flange 60 is rigidly attached to a first member or slider 62 and second member or guide 64. Slider 62 and guide 64 comprise a collapsible member or element 68 which is pivoted at hinge axis 70 about mounting block 72. Tensile means 74 is attached at two points 76 and 78 to the object flange 60 and loops around a guide pulley 80 which is part of a pre-tension device or first energizing means 66. The pre-tension device 66 includes a cylinder 67 on slider 62, which encloses a piston 69 having a piston rod 71. The piston rod extends out of the cylinder to support the guide pulley 80. Means such as a spring or screw may be included in the cylinder 67 to provide a continuous bias as the repulsive force tending to separate the pulley 80 and object flange 60 to keep the tensile means 74 taut. The tensile means 74 provides tension forces T1 and T2 at attachment points 76 and 78, respectively, to counteract the dynamic and static forces exerted on the flange 60 during the operation of the invention. This includes the repulsive force F applied by the pre-tension device 66.

The length of each branch or portion of the tension means 74 can be changed by means of actuators 82 and 84, shown in FIG. 5, coupled to mounting pulleys 86 and 88, respectively, hence allowing the object flange 60 to be moved to and fro with respect to the mounting block 72 depending on the direction of rotation of each actuator. If both actuators rotate in the clockwise direction (FIG. 4) such that the branch 74a of tensile means 74 is elongated and the branch 74f is shortened, the object flange 60 moves from the position indicated generally by the letter A to the position indicated by the letter B to effect a generally pivotal motion about hinge axis 70. If the actuators rotate with respect to each other in opposite directions, (pulley 88 counterclockwise, pulley 86 clockwise) branches 74a and 74f can be elongated and branches 74c and 74d are shortened simultaneously to effect an outward displacement of object flange 60 away from hinge axis 70, as indicated by the letter C. During such displacement, pulley 80 is also outwardly displaced while continuing to keep the tensile means 74 taut. On the other hand, actuator rotation can be in opposite directions (pulley 86 counterclockwise, pulley 88 clockwise) reversing the shortening and elongating effects in branches 74a, 74f, 74c and 74d to effect an inward motion or displacement of object flange 60 towards hinge 70.

Therefore, by controlling the relative lengths of the outside portions of the tensile means 74, the object flange 60 is caused to move through two degrees of freedom within the positional limits of the collapsible member 68, and the planar constraints of the hinge 70.

Preferably, the mounting pulleys 86 and 88 and guide pulleys 90, 92 and 80 are planarly aligned to allow the tensile means 74 to be folded substantially in one plane and to align their rotational axes parallel to the hinge axis 70. This reduces the operating strains on the tensile means 74 and enhances its durability. Appreciable deviations from this preferred arrangement are allowable by virtue of the length and torsional compliance prevalent in components adaptable for use as the tensile means 74.

Two additional blocks 94 and 96 support actuators 82 and 84 and pulleys 86 and 88 to structural supports 98 and 100, respectively. Structural support 100 is shown to be common with that supporting the pivotal block 72 while support 98 is shown in the same work space, but detached so that it may be independently mounted with respect to the work space to minimize the loading on the tensile means 74 in relation to forces acting on the mechanism. Thus, it should be noted that blocks 72, 94 and 96 may be mounted at a multitude of locations within the environment or working space of the robot, selected such that the forces applied on the object flange 60 by tensile means 74 remain in balance with the operating forces of the mechanism limited only by the planar constraints of the figure and embodiment. For example, assuming the mechanism is located in a vertical plane, if a horizontal force P represents the prevailing direction of the externally applied forces, it would be beneficial to locate block 94 upwards, from where it is shown, such that branch 74a hence T1, would have a larger horizontal force component to balance a corresponding component of P. Better positioning with less energy consumption would then be possible.

The pre-tension device 66 may be located anywhere along the tensile means 74, between mounting pulleys 86 and 88. For example, two other convenient locations in this embodiment to apply pre-tension are at guide pulleys 90 and 92.

In this embodiment, the use of the pre-tension device compensate for any slack in the tensile means 74 as well as providing the repulsive force F to the collapsible element 68 and means for balancing the energy demands on actuators 82 and 84. For example, in the position shown in FIG. 4, the mechanism is generally in equilibrium, with actuators 82 and 84 required only to maintain the small difference between the forces T1 and T2 and the repulsive force F generated by the pre-tension device 66. The difference in the forces between T1 and T2 is a result of their independent mounting configuration. Mounting pulley 86 is mounted higher than mounting pulley 88, thus T2 exerts less of a force than T1. To counteract an additional force, such as a force of gravity, inertia, or a process tool, T2 for example, would be increased and T1 reduced to compensate for the difference in the forces. This would change the force balance on both actuators 82 and 84, hence demanding an increase of torque from one and a decrease from the other. On the other hand, if no pre-tension was applied, T1 would be zero and T2 would have to be increased by almost double the difference between the tension of T1 and T2, of the example, causing actuator 84 to carry the full load without sharing by actuator 82.

The invention can still be carried out with accumulating means at pulleys 86 and 88, with branches 74a and 74f separated, into independent tensile portions, and the pre-tension 66 attached to push slider 62 out of guide 64. Pulleys 86 and 88 could then be replaced by a spool that accumulates a tape-like tensile members. If a drum is used such as described in U.S. Pat. No. 4,683,773, a cable-like element would be preferred. However, the teachings of the invention for the independent anchoring of the actuators 82 and 84 and the selectivity of their position will still allow the invention to provide considerable advantages over the prior art in flexibility of installation, modularity, and ability to optimize the loading on the tensile members in accordance with the prevailing external loading conditions.

Figure 8:
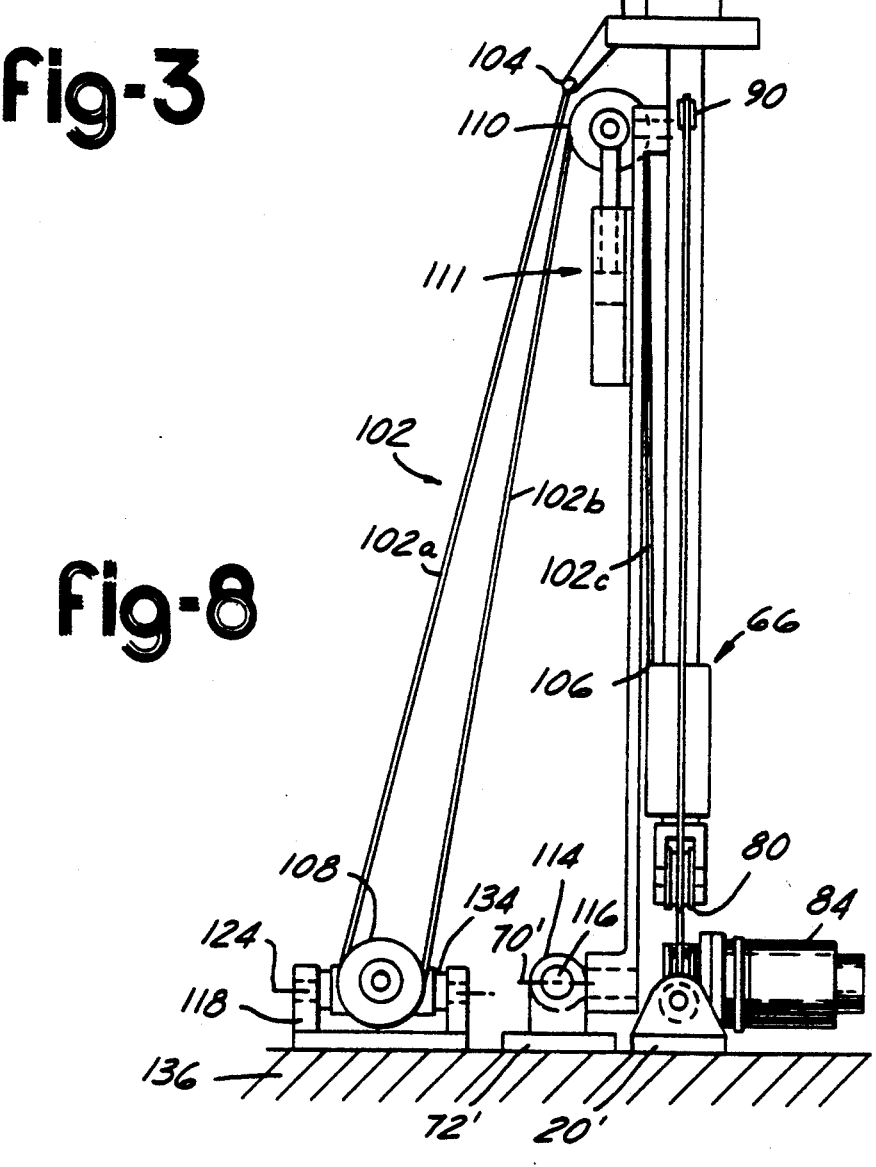
FIG. 8 is a side elevational view of the invention taken along the line 8—8 of FIG. 7 with a wrist mechanism attached to the object flange.
Figure 6:
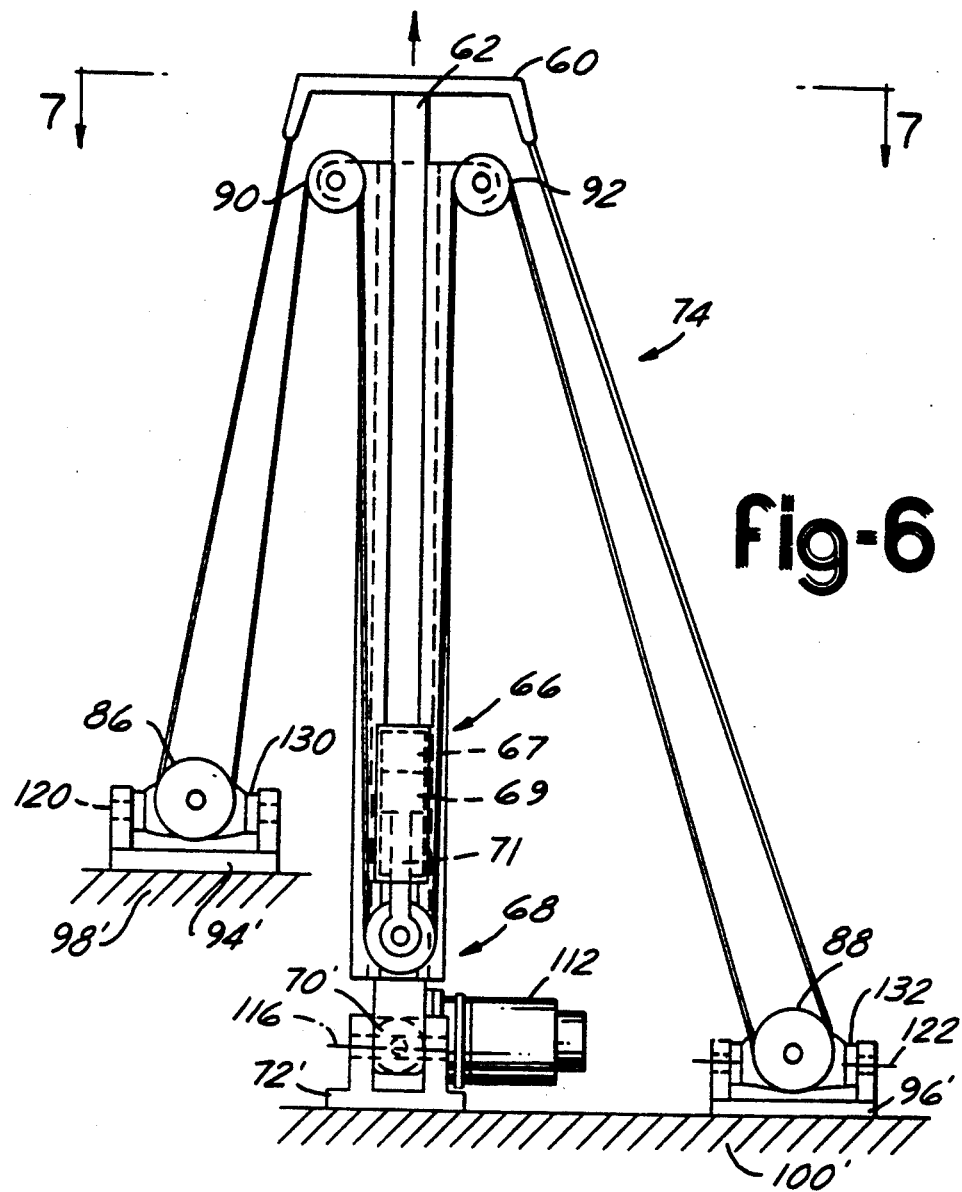
FIG. 6 is a side elevational view, somewhat schematic, showing a third embodiment incorporating the principles of the invention and having three degrees of freedom.
Figure 7:
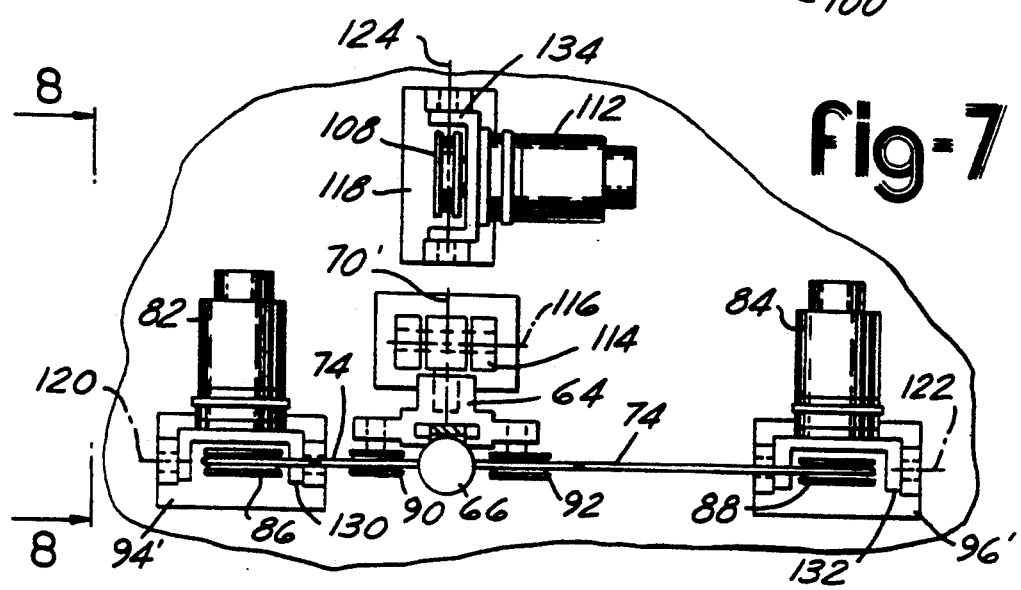
FIG. 7 is a sectional view, partly in elevation taken along the line 7—7 of FIG. 6.

FIGS. 6, 7 and 8 show the invention of FIG. 4 in an embodiment applicable to a three degree of freedom positioning mechanism, most suitable for robotic applications. Components of the invention that are identical to those of FIGS. 4 and 5 are identified by the same numerals, whereas components of similar function carry the same numerals with a prime ('). In FIG. 8, another tensile member 102 is shown attached to object flange 60 at point 104 and to guide 64 at point 106 as it loops around mounting pulley 108 and guide pulley 110.

A pre-tensioning device or second energizing means 111, having forcing means such as a spring, air pressure, hydraulic pressure, or a screw, keeps tensile member 102 under a predetermined tension. Mounting pulley 108 is driven by actuator 112. Collapsible element 68 is pivoted to block 72' having coupler 114 and two pivotal axes 701 and 116 which are preferably orthogonal and intersecting. However, a non-intersecting, oblique, positional relationship between axes 70' and 116 is equally functional except in adding more complexity to the mathematical representation of the mechanism, hence to its control algorithm, when applied to a robot structure. Actuators 82, 84 and 112 are mounted on identical blocks 94', 96' and 118 by a pivotal arrangement having pivotal axes 120, 122 and 124, respectively, and fulcrum elements 130, 132 and 134, respectively.

Preferably, axes 120 and 122 are coplanar and parallel to axis 116. Also preferably, mounting pulleys Also preferably, mounting pulley 108 and guide pulley 110 are coplanar and axes 70' and 124 are coplanar and parallel. However, for these relationships, deviations from parallelism or from being coplanar are workable in light of the flexibility of the tensile elements 74 and 102.

It is shown that block 118 and pivotal block 72' share the same mounting structure 136, while blocks 94' and 96' are mounted on separate and detached structures 98' and 100'. Similarly, to the description of FIGS. 4 and 5, many mounting locations are possible for the blocks 72', 94', 96' and 118, and can be all separate and independent, provided the selection of such locations does not adversely strain the tensile members 74 and 102 or disturb the balance of forces on object flange 60.

The rotation of pulley 108 shortens or extends section 102a of element 102 and causes the flange 60, the slider 62 and the guide 64 to rotate about axis 116. A pre-tension device 111 is necessary to keep tensile member 102 taut. This is done by having the pre-tension device 111 either expand or retract. If however, the object flange 60 is displaced outwardly by actuators 82 and 84, as described above, the actuator 112 must also be simultaneously and correspondingly rotated to maintain the same angular orientation of flange 60 with respect to the pivot axis 116. In order to maintain near planar operation for tensile members 74 and pulleys 86, 88, 90 and 92, actuators 82 and 84 are mounted on fulcrum elements 130 and 132. Similarly, to maintain near planar operation of tensile member 102 and mounting pulley 108 and guide pulley 110 when the flange 60 is rotated around axis 70', the actuator 112 is mounted on fulcrum 134 to rotate about axis 124 which is preferably parallel to axis 70'. This planar arrangement allows a single tensile member 74 to be operated upon by two actuators 82 and 84 hence splitting the driving energy requirements for two degrees of motion freedom.

Accordingly, with three actuators 82, 84 and 112, the object flange 60 can be moved in three dimensional space with three degrees of freedom comprising two rotations, about axes 70' and 116, and a linear movement along a line that is generally oblique to both axes 70' and 116, preferably intersects axis 70', and is also preferably offset from axis 116.

In FIG. 8, the invention is applied as a 6 degree of freedom manipulator. A generalized wrist assembly 142 is actuated by a set of motors housed in housing 144, and carries an end-effector such as a gripper 146. The wrist 142 has three degrees of rotational freedom indicated by arrows 150, 152 and 154.

The addition of a robotic wrist allows the mechanism to be used effectively as a six degree of freedom robotic manipulator in a three dimensional space, with the gross positional manipulation provided by the invention and the local positioning and orientation provided by the wrist mechanism. To increase the work envelope of the robotic manipulator, the linear travel of the slider 62 and the length of the tensile members can be increased with no other major modifications. With the ability to use high strength cables, belts, carbon graphite ribbons, and high strength wires as tensile members, large loads can be manipulated within a large work envelope by a relatively low weight manipulator. Furthermore, the manipulator weight is impacted relatively little by the increase in the work envelope.

It should be noted, of course, that for the mechanism to be used as a manipulator, feedback devices should be provided to sense the position of the object directly, or, indirectly by sensing the position and orientation of the slider 62 and the length of the tensile elements 102 and 74. A programmable controller 46 is required to activate the actuators in response to signals provided by the feedback devices and the commanded position signals of a controls program. This is a conventional automatic controls approach familiar to persons educated in robotics and the field of numeral controls and is applied readily to the invention to provide the customary accuracy and manipulative flexibility found in conventional robots.

The invention lends itself to direct feedback control, such as by sensing the position of the object in space without sensing the position of its supporting or actuating structures. Triangulation methods have been used for determining the position of an object in space by means of two digital cameras and one light source attached to the moving object. For example, a commercially available system, based on this principle, in U.S. Pat. No. 4,639,878 to Day et al.

Indirect position sensing approaches are used in almost all conventional robots, wherein the position of the end effector is determined from measurements made at the joints of the robot structure; programmable controllers are programmed with geometric transformation algorithms to relate the position of the end effector to the measured joint positions. The same approach can be used with the invention to relate the position of the object flange, or end effector, to the measurements made, for example, to the position of the slider 62 and its two angles of inclination to the pivot block 72' and measured at axis 116 and axis 70'. A two-axis gimbaled arrangement may be used to allow independent measurements for the angular position of the collapsible element 4 relative to two independent and orthogonal axes. Feedback devices may also measure the lengths of the tensile member branches 74a, 74f and 102a which are related by geometric transforms to the position of the object flange, the lengths of the tensile members may then be adjusted by their actuators to locate the object flange at the desired location, or allow the object flange to transverse a desired path.

Generally, in robotic operation, the transversing of a path is equivalent to the positioning at several sequential positions along the path, but without commanding the actuators to cause the object flange to stop at any intermediate position along the path. Accordingly, the description of positioning with this mechanism is equally applicable to controlled motion operation along a given prescribed path of a point at which a productive robotic process may be performed, known as the tool center point.

When fitted with the robotic wrist 142, the position of the end effector 146 may be fully defined in space by the addition of three more measurements made at the wrist joints in a conventional manner. The six measurements that can be made to fully define the position and orientation of the end effector can be related by geometric transformations to the corresponding length of the tensile members as well as the position of the wrist actuators. The programmable controller 46 then commands the six actuators of the robotic manipulator to effect the necessary position of the end effector.

Although the object flange 60 is shown to be rigidly connected to the slider 62, it is obvious that a pivotal arrangement can be provided similar to the pivotal arrangement between the guide 64 and the block 72, wherein the object flange 60 may have one or two degrees of rotation for orientation relative to the slider 62. The two degrees of freedom may be further constrained by two additional actuators mounted either directly on the slider 62, or, at a mounting structure, such as 136, and actuated remotely by tensile members similar to the arrangement shown in FIG. 1. Mounting such actuators at the base, however, and only for orientation control, would complicate the pulley arrangements unjustifiably. Thus, the preferred embodiment is for the use of the teachings of this invention to provide up to three degrees of freedom for positioning, and the addition of a 1, 2 or 3 degree of freedom mechanism at object flange 60. Additional orientational freedom can then be attained at the required level of motion flexibility, up to 6 degrees of freedom for a kinematically determinate system in a three dimensional space.

FIG. 9 shows the use of the light weight robot mechanisms. Each mechanism is adaptable to the mounting structure 20, such as the spray painting booths shown. Each robot has its anchor blocks 94, 96 and 118 independently mounted to the mounting structure 20. This provides easy, energy efficient manipulation of a wrist assembly 142 by its respective robot mechanism moving in three degrees of freedom so that the wrist assembly 142 may rotate about its three degrees of freedom to perform its intended function on the workpiece 160.

While the embodiments of the present invention herein disclosed constitute preferred forms, it is to be understood that other forms may be adopted within the scope of the following claims.

What is claimed is:

1. An object positioning mechanism adjustable with respect to a work space adaptable for working on a large workpiece such as a commercial aircraft or the like, comprising:
   a structure surrounding said work space;
   a pivot block adapted to be fixed with respect to said structure;
   an object flange spaced from said pivot block and adapted to hold a tool for working on said workpiece;
   a collapsible element having first and second members movable linearly with respect to each of other;
   the first member being pivotally connected to the pivot block and the second member being affixed to the object flange;
   a plurality of anchor blocks each being independently mountable on said structure with respect to the pivot block and the work space;
   a plurality of actuators, each mounted on a respective one of the anchor blocks; and
   tensile means including a plurality of tensile portions, at least two of said tensile portions connected at one end thereof to the object flange and at the respective other ends thereof to a respective one of the actuators, each of the actuators being energizable to change the length of its respective tensile portion by selectively pulling on its respective tensile portion whereby the tensile portions in cooperation with said collapsible element exert forces on the object flange that provide a state of force equilibrium, and wherein the anchor blocks are mountable on said structure with respect to the pivot block and each anchor block is mounted independently of each other anchor block to minimize the loading on the actuators in relation to the applied forces acting on the mechanism.

2. The object positioning mechanism of claim 1 wherein the first and second members of the collapsible element are telescopically movable with respect to each other.

3. The object positioning mechanism of claim 1 wherein the actuators include spools to selectively accumulate and pay out their respective tensile portions.

4. An object positioning mechanism adjustable with respect to a work space adaptable for working on a large workpiece such as a commercial aircraft or the like, comprising:
   a base adapted to be fixed with respect to said work space;
   an object flange spaced from said base and adapted to hold a tool for working on said workpiece;
   a collapsible element having first and second members movable linearly with respect to each other;
   the first member being pivotally connected to the base and the second member being affixed to the object flange;
   a plurality of anchor blocks each being independently mountable with respect to the base and the work space;
   a plurality of actuators, each connected to a respective one of the anchor blocks;
   tensile means including a plurality of tensile portions, at least two of said tensile portions connected at one end thereof to a respective one of the actuators, each other ends thereof to a respective one of the actuators, each of the actuators being energizable to change the length of its respective tensile portion by selectively pulling on its respective tensile portion; an energizing means operable through the first and second members of the collapsible member to push the object flange away from the base whereby the object flange is always pulled by the tensile means toward the base while the object flange is simultaneously being pushed away from the base to place the object flange in a state of force equilibrium, said anchor blocks being mounted independently of each other and the base to position their respective actuator with respect to the work space to minimize the energy required to energize the actuators; and
   wherein the tensile means is a continuous element including said at least two of said tensile portions and operative with two of said actuators.

5. The object positioning mechanism of claim 4 wherein the continuous element has two ends connected respectively to the object flange.

6. The object positioning mechanism of claim 4 wherein the actuators connected to the at least two of said tensile portions include drive pulleys to change the length of its respective tensile portion of the continuous tensile means.

7. The object positioning mechanism of claim 6 wherein the energizing means includes pulleys on said collapsible member coplanar with the drive pulleys on said actuators for supporting the tensile means in its continuity and cooperating with the drive pulleys as such drive pulleys change the length of a respective tensile portion.

8. An object positioning mechanism adjustable with respect to a work space adaptable for working on a large workpiece such as a commercial aircraft or the like, comprising:
   a structure surrounding said work space;
   a pivot block adapted to be fixed with respect to said structure;
   an object flange spaced from said pivot block and adapted to hold a tool for working on said workpiece,
   a collapsible element having first and second members movable linearly with respect to each other;
   the first member being pivotally connected to the pivot block and the second member being affixed to the object flange;

a plurality of anchor blocks each being independently mountable on said structure with respect to the pivot block and the work space;

a plurality of actuators, each pivotally mounted on a respective one of the anchor blocks; and tensile means including a plurality of tensile portions, at least two of said tensile portions connected at one end thereof to the object flange and at their respective other ends thereof to a respective one of the actuators, each of the actuators being energizable to change the length of its respective tensile portion by selectively pulling on its respective tensile portion whereby the tensile portions in cooperation with said collapsible element exert forces on the object flange that provide a state of force equilibrium, and wherein the anchor blocks are mountable on said structure with respect to the pivot block to minimize the loading on the actuators in relation to the applied forces acting on the mechanism;

energizing means operable through the first and second members of the collapsible member to push the object flange away from the pivot block whereby the object flange is always pulled by the tensile means toward the pivot block while the object flange is simultaneously being pushed away from the pivot block to place the object flange in a state of force equilibrium, said anchor blocks being mounted independently of each other and the pivot block to position their respective actuator with respect to the work space to minimize the energy required to energize the actuators;

said object positioning mechanism including a third tensile portion connected to one of the actuators and having one end connected to the object flange and the other end connected to the second member of said collapsible member, and second energizing means cooperable with the first said energizing means and operable through the first and second members of the collapsible member to push the object flange away from the pivot block while the object flange is pulled by the third tensile portion toward the pivot block, whereby to provide said object positioning mechanism with three degrees of freedom.

9. An object positioning mechanism adjustable with respect to a work space adaptable for working on a large workpiece such as a commercial aircraft or the like, comprising:

a base adapted to be fixed with respect to said work space;

an object flange spaced from said base and adapted to hold a tool for working on said workpiece;

a collapsible element having first and second members movable linearly with respect to each other;

the first member being pivotally connected to the base and the second member being affixed to the object flange;

a plurality of anchor blocks each being independently mountable with respect to the base and the work space;

a plurality of actuators, each connected to a respective one of the anchor blocks;

tensile means including a plurality of tensile portions, at least two of said tensile portions connected at one end thereof to the object flange and at their respective other ends thereof to a respective one the actuators, each of the actuators being energizable to change the length of its respective tensile portion by selectively pulling on its respective tensile portion;

an energizing means operable through the first and second members of the collapsible member to push the object flange away from the base whereby the object flange is always pulled by the tensile means toward the base while the object flange is simultaneously being pushed away from the base to place the object flange in a state of force equilibrium, said anchor blocks being mounted independently of each other and the base to position their respective actuator with respect to the work space to minimize the energy required to energize the actuators;

said object positioning mechanism including a pulley fixed with respect to said base for supporting said tensile means between the said one ends of said tensile portions, said energizing means operating through said pulley and said object flange to maintain tension in said tensile means while said tensile portions both push and pull said object flange with respect to said base.

10. An object positioning mechanism adjustable with respect to a work space adaptable for working on a large workpiece such as a commercial aircraft or the like, comprising:

a base adapted to be fixed with respect to said work space;

an object flange spaced from said base and adapted to hold a tool for working on said workpiece;

a collapsible element having first and second members movable linearly with respect to each other;

the first member being pivotally connected to the base and the second member being affixed to the object flange;

a plurality of anchor blocks each being independently mountable with respect to the base and the work space;

a plurality of actuators, each connected to a respective one of the anchor blocks;

tensile means including a plurality of tensile portions, at least two of said tensile portions connected at one end thereof to the object flange and at their respective other ends thereof to a respective one of the actuators, each of the actuators being energizable to change the length of its respective tensile portion by selectively pulling on its respective tensile portion; an energizing means operable through the first and second members of the collapsible member to push the object flange away from the base whereby the object flange is always pulled by the tensile means toward the base while the object flange is simultaneously being pushed away from the base to place the object flange in a state of force equilibrium, said anchor blocks being mounted independently of each other and the base to position their respective actuator with respect to the work space to minimize the energy required to energize the actuators; and wherein each tensile portion terminates at one end at said object flange and has another end connected to the first member of the collapsible member.

11. An object positioning mechanism adjustable with respect to a work space adaptable for working on a large workpiece such as a commercial aircraft or the like, comprising:

a mounting structure defining ceiling and walls surrounding said work space;

a pivot block adapted to be fixed with respect to one of said ceiling and walls of said structure;

an object flange spaced from said pivot block and adapted to hold a tool for working on said workpiece;

a collapsible element having first and second members movable linearly with respect to each other;

the first member being pivotally connected to the pivot block and the second member being affixed to the object flange;

a plurality of anchor blocks each being independently mountable with respect to the pivot block and said work space on a selected one of the ceiling and walls of said structure;

a plurality of actuators, each mounted on a respective one of the anchor blocks; and tensile means including a plurality of tensile portions, at least two of said tensile portions connected at one end thereof to the object flange and at their respective other ends thereof to a respective one of the actuators, each of the actuators being energizable to change the length of its respective tensile portion by selectively pulling on its respective tensile portion whereby the tensile portions in cooperation with said collapsible element exert forces on the object flange that provide a state of force equilibrium, and wherein each anchor block is mounted independently of each other anchor block on a preselected one of the ceiling and walls to minimize the loading on the actuators in relation to the applied forces acting on the mechanism.

12. An object positioning mechanism adjustable with respect to a work space adaptable for working on a large workpiece such as a commercial aircraft or the like, comprising:

a mounting structure defining non-co-planar mounting planes surrounding said work space;

a pivot block adapted to be fixed with respect to one of said mounting planes of said structure;

an object flange spaced from said pivot block and adapted to hold a tool for working on said workpiece;

a collapsible element having first and second members movable linearly with respect to each other;

the first member being pivotally connected to the pivot block and the second member being affixed to the object flange;

a plurality of anchor blocks each being independently mountable with respect to the pivot block and said work space on a selected one of the mounting planes of aid structure;

a plurality of actuators, each mounted on a respective one of the anchor blocks so that at least two of said actuators are mounted on different mounting planes; and tensile means including a plurality of tensile portions, at least two of said tensile portions connected at one end thereof to the object flange and at their respective other ends thereof to a respective one of the actuators, each of the actuators being energizable to change the length of its respective tensile portion by selectively pulling on its respective tensile portion whereby the tensile portions in cooperation with said collapsible element exert forces on the object flange that provide a state of force equilibrium, and wherein each anchor block is mounted independently of each other anchor block on a preselected one of the mounting planes to minimize the loading on the actuators in relation to the applied forces acting on the mechanism.

13. The object positioning mechanism of claim 12 wherein said mounting planes are intersecting planes.

* * * * *

UNITED STATES PATENT AND TRADEMARK OFFICE
CERTIFICATE OF CORRECTION

PATENT NO. : 5,313,854
DATED : May 24, 1994
INVENTOR(S) : Hadi A. Akeel

It is certified that error appears in the above-identified patent and that said Letters Patent is hereby corrected as shown below:

Column 5, line 51
after "to" delete ",";

Column 8, line 22
after "pretension"... insert --device--;

Column 8, line 50
after "axes" replace "701" with --70'--;

Column 8, line 61
after "pulleys" insert --86 and 88 and guide pulleys 90 and 92 are co-planar.--;

Column 10, line 11
after "principle," insert --is known by the trade name Selspot; another is disclosed--;

Column 11, line 46, Claim 1
after "and at" replace "the" with --their--;

Column 12, line 19, Claim 4
after "thereof to" insert --the object flange and at their respective other ends thereof to--;

Column 12, lines 20-21, Claim 4
after ", each" delete "other ends thereof to a respective one of the actuators, each"; and

UNITED STATES PATENT AND TRADEMARK OFFICE
CERTIFICATE OF CORRECTION

PATENT NO. : 5,313,854

DATED : May 24, 1994

INVENTOR(S) : Hadi A. Akeel

It is certified that error appears in the above-identified patent and that said Letters Patent is hereby corrected as shown below:

Column 16, line 16, claim 12 after "planes of" replace "aid" with --said--.

Signed and Sealed this

Thirteenth Day of December, 1994

Attest:

BRUCE LEHMAN

Attesting Officer

Commissioner of Patents and Trademarks